United States Patent
Guo

(10) Patent No.: US 12,476,300 B2
(45) Date of Patent: Nov. 18, 2025

(54) INSULATION DETECTION DEVICE AND INSULATION DETECTION METHOD FOR COOLING PLATE OF BATTERY PACK

(71) Applicant: Lucky Link (Jia Xing) EV Technology Co., Ltd, Jiaxing (CN)

(72) Inventor: Li Guo, Jiaxing (CN)

(73) Assignee: LUCKY LINK (JIA XING) EV TECHNOLOGY CO., LTD., Jiaxing (CN)

( * ) Notice: Subject to any disclaimer, the term of this patent is extended or adjusted under 35 U.S.C. 154(b) by 679 days.

(21) Appl. No.: 17/956,059

(22) Filed: Sep. 29, 2022

(65) Prior Publication Data
US 2023/0335828 A1    Oct. 19, 2023

(30) Foreign Application Priority Data

Apr. 14, 2022 (CN) .......................... 202210401368.3

(51) Int. Cl.
*H01M 10/6554* (2014.01)
*H01M 10/48* (2006.01)
*H01M 10/613* (2014.01)
*H01M 10/625* (2014.01)

(52) U.S. Cl.
CPC ..... *H01M 10/6554* (2015.04); *H01M 10/486* (2013.01); *H01M 10/613* (2015.04); *H01M 10/625* (2015.04); *H01M 2220/20* (2013.01)

(58) Field of Classification Search
CPC .......... H01M 10/6554; H01M 10/613; H01M 10/48; H01M 10/486; G01R 1/20; G01R 1/203; G01R 1/30; G01R 1/04
See application file for complete search history.

(56) References Cited

U.S. PATENT DOCUMENTS

| | | | |
|---|---|---|---|
| 687,518 A * | 11/1901 | Clark | B05C 3/15 118/712 |
| 4,160,947 A * | 7/1979 | Tanno | G01R 31/58 324/541 |
| 2020/0090825 A1* | 3/2020 | He | G21H 1/00 |
| 2020/0227794 A1* | 7/2020 | Mazza | H01M 10/6567 |

FOREIGN PATENT DOCUMENTS

WO    WO-2019121875 A1 *   6/2019 ............. G01R 31/54

* cited by examiner

*Primary Examiner* — Nicholas A Smith
*Assistant Examiner* — Michael R. Worden
(74) *Attorney, Agent, or Firm* — Enable IP, P.C.

(57) ABSTRACT

An insulation detection device and an insulation detection method for a cooling plate of a battery pack are provided. The device includes: a liquid tank, a fixing apparatus, and an insulation detector. The liquid tank is configured to hold a liquid metal. The liquid tank includes a liquid injection port and a liquid outlet. The fixing apparatus is configured to fix the cooling plate of the battery pack in the liquid tank, where the cooling plate of the battery pack is hollow, an outer surface of the cooling plate of the battery pack is coated with an insulation coating, and the outer surface of the cooling plate of the battery pack is immersed in liquid metal. The insulation detector is configured to measure a resistance between an inner wall of the cooling plate of the battery pack and the liquid metal.

10 Claims, 2 Drawing Sheets

INSULATION DETECTION DEVICE AND INSULATION DETECTION METHOD FOR COOLING PLATE OF BATTERY PACK

CROSS REFERENCE TO RELATED APPLICATION

This application claims priority to Chinese Patent Application No. 202210401368.3, filed on Apr. 14, 2022, which is hereby incorporated by reference in its entirety.

FIELD

The present disclosure relates to the technical field of new energy, and in particular to an insulation detection device and an insulation detection method for a cooling plate of a battery pack.

BACKGROUND

New energy vehicles are vehicles with advanced technical principles, new technologies and new structures. The new energy vehicles use unconventional vehicle fuels as power sources (or use conventional vehicle fuels or adopt new vehicle power units), and integrate advanced technologies in vehicle power control and drive.

With the development of global new energy vehicles, the power sources of the new energy vehicles mainly include: lithium-ion batteries, nickel-metal hydride batteries, lead-acid batteries, and super capacitors. The super capacitors are mostly used as auxiliary power sources. According to the voltage requirements of the vehicles, several modules are connected in series to raise the voltage, which is the module packaging technology. A cooling plate of a battery pack may be used to provide support for the battery pack.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

In a first aspect, an insulation detection device for a cooling plate of a battery pack is provided according to an embodiment of the present disclosure. The insulation detection device includes: a liquid tank, a fixing apparatus, and an insulation detector. The liquid tank is configured to hold a liquid metal, where the liquid tank includes a liquid injection port and a liquid outlet, the liquid metal is injected via the liquid injection port, and the liquid metal is exported via the liquid outlet. The fixing apparatus is configured to fix the cooling plate of the battery pack in the liquid tank, where the cooling plate of the battery pack is hollow, an outer surface of the cooling plate of the battery pack is coated with an insulation coating, and the outer surface of the cooling plate of the battery pack is immersed in liquid metal. The insulation detector is configured to measure a resistance between an inner wall of the cooling plate of the battery pack and the liquid metal.

In a second aspect, an insulation detection method is provided according to an embodiment of the present disclosure. The method includes: connecting the cooling plate of the battery pack to the fixing apparatus; injecting the liquid metal into the liquid tank; turning on the insulation detector; and determining whether the insulation coating of the cooling plate of the battery pack reaches a preset insulation condition based on a resistance measured by the insulation detector.

With the insulation detection device and the method for a cooling plate of a battery pack according to the embodiments of the present disclosure, liquid metal with viscosity may be used as conductive material, thereby reducing the risk of leakage of conductive materials and improving the safety and accuracy of insulation detection.

Specifically, according to the technology in the field of detecting the cooling plate of the battery pack, since the voltage applied during the insulation test is very high, the leakage caused by the liquid conductive material may cause great danger, so the liquid is generally not used as the conductive material. In the solutions according to the embodiments, liquid metal is used as the conductive material, reducing the risk of leakage and improving the safety of insulation detection.

In addition, the liquid metal has excellent features of wrapping and contacting the outer surface of the cooling plate of the battery pack, and leakage points are not to be missed due to poor contact between the conductive material and the out surface of the cooling plate of the battery pack, thereby improving the detection accuracy. That is, in a case that the conductive material is in poor contact with the cooling plate of the battery pack (indicating that there is no contact at some positions) and the positions with poor contact are exactly positions without insulating coating, the absence of the insulating coating cannot be detected, resulting in detection errors.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

Figure 1:
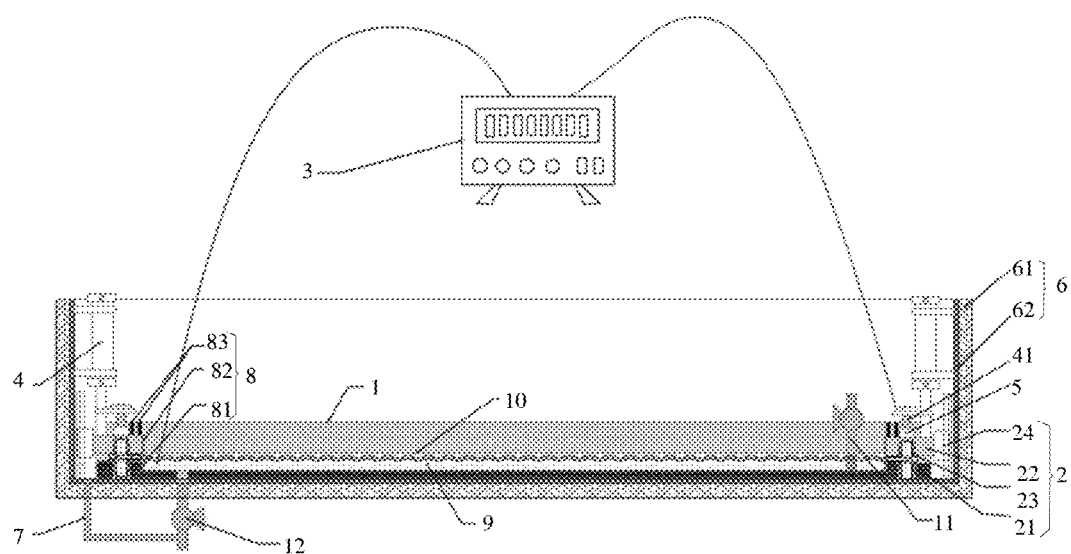
FIG. 1 is a schematic structural diagram of an insulation detection device according to an embodiment of the present disclosure.

REFERENCE NUMERALS ARE LISTED AS FOLLOWS 1 liquid tank 1
11 injection port
12 liquid outlet
2 fixing apparatus
21 first insulation element
22 second insulation element
23 connection pieces
24 slide rail bearing
3 insulation detector
4 cylinder
41 pressing element
5 conductive pressing block
6 housing
61 shell
62 inner tank
7 overflow pipe 8 sealing apparatus
81 lower sealing baffle
82 upper sealing baffle
83 sealing strip
9 liquid metal
10 cooling plate of battery pack

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on". The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Reference is made to FIG. 1, which shows a schematic structural diagram of an insulation detection device according to an embodiment of the present disclosure. As shown in FIG. 1, the insulation detection device may include: a liquid tank 1, a fixing apparatus 2, and an insulation detector 3.

In the embodiment, the liquid tank is configured to hold a liquid metal.

The liquid tank includes a liquid injection port 11 and a liquid outlet 12. The liquid metal 9 is injected via the liquid injection port 11, and the liquid metal 9 is exported via the liquid outlet 12.

In some embodiments, the liquid metal may be a metal that is in a liquid state at ambient temperature. The viscosity of liquid metal is greater than the viscosity of pure water.

In some embodiments, the operation environment of the insulation detection device may be determined based on a melting point of the liquid metal. As an example, the melting point of liquid metal is slightly below a room temperature. In an embodiment, the temperature of the operation environment of the insulation detection device may be higher than a room temperature without affecting the performance of the cooling plate of the battery pack.

In the embodiment, the type of the liquid metal may be determined according to actual application scenarios, which is not limited herein. As an example, the liquid metal as a conductive material may be an alloy functional material. Technical features, such as the melting point, the fluidity, the adhesion, and the electrical conductivity, of the alloy functional material may be configured according to practical applications.

In the embodiment, the fixing apparatus is configured to fix the cooling plate 10 of the battery pack in the liquid tank.

The cooling plate of the battery pack is hollow. An outer surface of the cooling plate of the battery pack is coated with an insulation coating. The outer surface of the cooling plate of the battery pack is immersed in liquid metal.

The hollow cooling plate of the battery pack may be filled with liquid for heat dissipation. The outer surface of the cooling plate of the battery pack is coated with an insulation coating to avoid short-circuiting of the battery pack due to battery leakage. There may be errors in the laying of the insulation coating. That is, in a case that the laying of the insulation coating is uneven or incomplete, the insulation degree of the insulation coating of the cooling plate of the battery pack does not meet a preset requirement.

In the embodiment, the insulation detector is configured to measure a resistance between an inner wall of the cooling plate of the battery pack and the liquid metal.

The insulation detector 3 may include two measuring ends which are generally configured to detect whether an object between the two measuring ends conducts electricity, that is, to detect whether the object between the two measuring ends is insulated. The type (such as the operation principle and the model) of the insulation detector may be selected according to actual application scenarios.

It should be noted that with the insulation detection method for a cooling plate of a battery pack according to the embodiments, liquid metal with viscosity may be used as conductive material, thereby reducing the risk of leakage of conductive materials and improving the safety and accuracy of insulation detection.

Specifically, according to the technology in the field of detecting the cooling plate of the battery pack, since the voltage applied during the insulation test is very high, the leakage caused by the liquid conductive material may cause great danger, so the liquid is generally not used as the conductive material. In the solutions according to the embodiments, liquid metal is used as the conductive material, reducing the risk of leakage and improving the safety of insulation detection.

In addition, the liquid metal has excellent features of wrapping and contacting the outer surface of the cooling plate of the battery pack, and leakage points are not to be missed due to poor contact between the conductive material and the out surface of the cooling plate of the battery pack, thereby improving the detection accuracy. That is, in a case that the conductive material is in poor contact with the cooling plate of the battery pack (indicating that there is no contact at some positions) and the positions with poor contact are exactly positions without insulating coating, the absence of the insulating coating cannot be detected, resulting in detection errors.

In some embodiments, the melting point of the liquid metal is less than or equal to a first temperature threshold.

In some embodiments, the first temperature threshold is no greater than 15 degrees Celsius. As an example, the first temperature threshold is not less than 9 degrees Celsius and not greater than 11 degrees Celsius.

It should be noted that the first temperature threshold may be determined according to actual application scenarios. The first temperature threshold is not greater than 15 degrees Celsius, so that the influence of the ambient temperature of the insulation detection environment on the insulation detection is small, thereby improving the accuracy of the insulation detection.

In some embodiments, the viscosity of the liquid metal is greater than or equal to a first viscosity threshold and less than or equal to a second viscosity threshold. The first viscosity threshold is greater than 0 and less than the second viscosity threshold.

It should be noted that the first viscosity threshold is configured for ensuring that the liquid metal is a liquid with a viscosity, so that the leakage risk of liquid metal is reduced. The second viscosity threshold is configured for ensuring that the liquid metal is not easy to stick, so that the impact on the cooling plate of the battery pack is reduced, that is, after the detection, the cooling plate of the battery pack may be restored to a usable state by simple cleaning.

In an embodiment, the first viscosity threshold is greater than or equal to 0.004 Pa·s. The second viscosity threshold is less than or equal to 0.02 Pa·s.

It should be noted that the first viscosity threshold is greater than or equal to 0.004 Pa·s, effectively preventing the leakage of liquid metal. The second viscosity threshold value is less than or equal to 0.02 Pa·s, facilitating cleaning after insulation inspection.

In some embodiments, the fixing apparatus further includes first insulation elements 21 and second insulation elements 22.

The first insulation elements are fixed on a bottom surface of the liquid tank. Both ends of each of the first insulation elements are arranged with protrusions.

The cooling plate of the battery pack is connected to the protrusions of each of the first insulation elements. In an embodiment, the cooling plate of the battery pack is in a shape of an elongated strip, and both ends of the elongated strip may be fixed at the protrusions of the first insulation elements.

The second insulation elements cooperate with the protrusions of the first insulation elements to clamp the cooling plate of the battery pack. As shown in FIG. 1, one end of the cooling plate of the battery pack may be clamped by a second insulation element 22 and a protrusion of a first insulation element 21 that cooperate with each other.

It should be noted that the first insulation elements and the second insulation elements are arranged to cooperate with each other, and the first insulation elements may include protrusions, so that the outer surface of the cooling plate of the battery pack may be placed in the liquid metal as much as possible, thereby performing adequate detection.

In some embodiments, the insulation detection device further includes a cylinder 4. The cylinder is configured to apply pressure to the second insulation elements 22 to fixedly connect the cooling plate of the battery pack to the liquid tank.

It should be noted that the cylinder applies pressure to reduce a gap between the first insulation elements and the cooling plate of the battery pack and a gap between the cooling plate of the battery pack and the second insulation elements, thereby reducing the possibility of the liquid metal flowing out from the gaps and improving the safety of the detection.

In some embodiments, a cross section of each of the protrusions of the first insulation elements is a circular ring, and a cross section of each of the second insulation elements is a circular ring. It should be understood that a first protrusion has a three-dimensional structure, and each of the first insulation elements also has a three-dimensional structure. By making a section in a horizontal direction as shown in FIG. 1, the cross section of the protrusion of each of the first protrusions is a circular ring, and an inner circle of the circular ring is hollow. Similarly, the cross section of each of the second insulation elements in the horizontal direction is a circular ring and an inner circle of the circular ring is hollow.

Each of two ends of the cooling plate of the battery pack is defined with a connection hole. In some embodiments, the cooling plate of the battery pack in use may be injected with a cooling liquid.

A hollow inner cavity is formed by an annular region of each of the first insulation elements and an annular region of each of the second insulation elements. Connection pieces 23 are arranged in the hollow inner cavity. The connecting pieces 23 may pass through the connection holes of the cooling plate of the battery pack.

It should be noted that the hollow inner cavity between the first insulation elements and the second insulation elements is arranged, the cooling plate of the battery pack may be fixed by using the connection holes of the cooling plate of the battery pack, thereby improving the reliability of fixing.

In some embodiments, the insulation detection device further includes conductive pressing blocks 5. Each of the conductive pressing blocks is not in contact with the liquid metal.

Each of the conductive pressing blocks is connected to the insulation detector, and is arranged above the connection pieces 23. The connection pieces are electrically connected to the inner wall of the cooling plate of the battery pack.

Thereby, a passage, from the inner wall of the cooling plate of the battery pack to the connection pieces, from the connection pieces to a conductive pressing block, and from a conductive pressing block to the insulation detector, may be formed. Due to that the conductive pressing blocks are not in contact with the liquid metal, the passage is not connected to the insulation coating on the outer surface of the cooling plate of the battery pack.

In some embodiments, the insulation detection device further includes a housing. The housing includes a shell 61 and an inner tank 62. The shell is made of insulating material, the inner liner is made of stainless steel, and the liquid tank is arranged in the housing.

In an embodiment, the height of the housing is greater than the height of the liquid tank.

Thus, the fixing apparatus and the liquid tank may be supported, thereby improving the stability of the liquid tank and the fixing apparatus and improving the reliability of the connection between the fixing apparatus and the liquid tank.

In some embodiments, the insulation detection device further includes an overflow pipe 7. A first end of the overflow pipe is arranged between the liquid tank and the housing, and a second end of the overflow pipe is connected to a pipe connected with the liquid outlet 12.

Therefore, the liquid metal occasionally overflowing from the liquid tank may be recovered in time and safely discharged in time, avoiding potential safety hazards.

In some embodiments, the cylinder may further include pressing elements 41. The pressing elements are arranged above the conductive pressing blocks, and are configured to apply pressure to the conductive pressing blocks to press the conductive pressing blocks.

In some embodiments, the fixing apparatus may further include sliding rail bearings 24. The sliding rail bearings 24 are configured to perform positioning on the second insulation elements 22 in moving, so that the second insulation elements 22 move along sliding rails while the second insulation elements and the first insulation elements are pressed.

In some embodiments, the insulation detection device further includes a sealing apparatus 8. In an embodiment, the sealing apparatus may include, but is not limited to, lower sealing baffles 81, upper sealing baffles 82, and sealing strips 83. The lower sealing baffles 81 may be configured to isolate the first insulation elements from the liquid metal. The upper sealing baffles 82 may be configured to isolate the second insulation elements from the liquid metal. The sealing strips 83 may be configured to isolate the conductive pressing blocks from the liquid metal.

Figure 2:
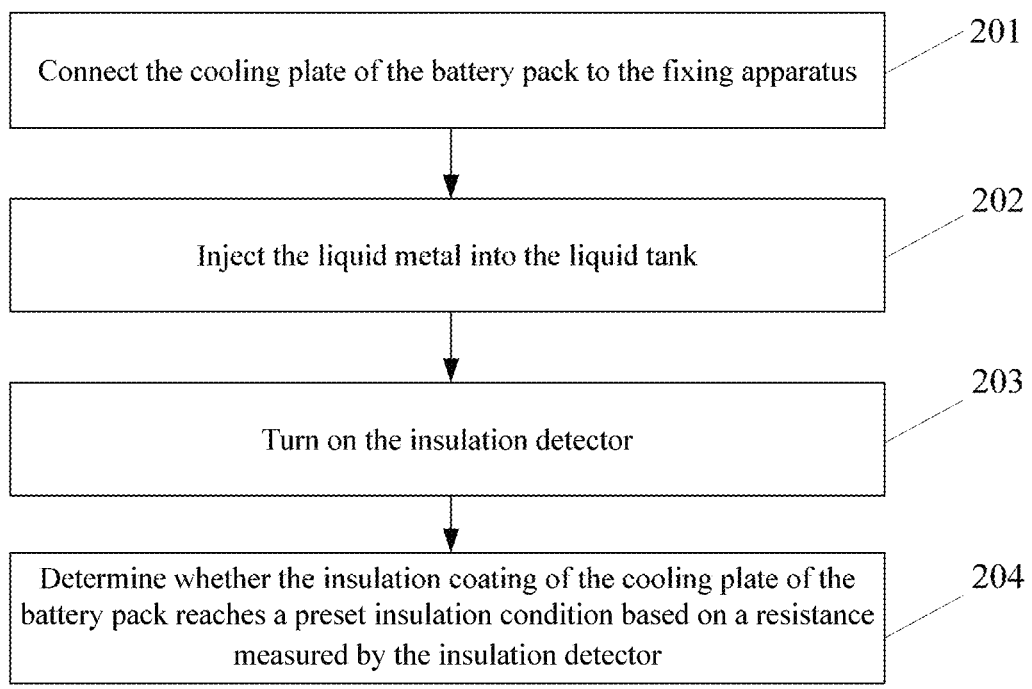
FIG. 2 is a flow chart of an insulation detection method according to an embodiment of the present disclosure.

Reference is made to FIG. 2, which shows a flow chart of an insulation detection method according to an embodiment of the present disclosure. The insulation detection method shown in FIG. 2 may be applied to the insulation detection device according to the embodiments of the present disclosure.

As shown in FIG. 2, the insulation detection method includes the following steps 201 to 204.

In step 201, the cooling plate of the battery pack is connected to the fixing apparatus.

In an embodiment, referring to FIG. 1, the insulation detection device may include: a liquid tank 1, a fixing apparatus 2, and an insulation detector 3. The liquid tank is configured to hold a liquid metal. The liquid tank may include a liquid injection port 11 and a liquid outlet 12. The liquid metal 9 is injected via the liquid injection port 11, and the liquid metal is exported via the liquid outlet 12. The fixing apparatus is configured to fix the cooling plate of the battery pack in the liquid tank. The cooling plate of the battery pack is hollow, an outer surface of the cooling plate of the battery pack is coated with an insulation coating, and the outer surface of the cooling plate of the battery pack is immersed in liquid metal. The insulation detector is configured to measure a resistance between an inner wall of the cooling plate of the battery pack and the liquid metal.

The cooling plate of the battery pack may be first connected to the fixing apparatus outside the liquid tank, and then putted into the liquid tank. Alternatively, the fixing apparatus may be arranged in the liquid tank, and then the cooling plate of the battery pack is connected to the fixing apparatus in the liquid tank.

In step 202, the liquid metal is injected into the liquid tank.

The type of the injected liquid metal may be selected according to actual application scenarios.

The volume and height of the injected liquid metal may be determined based on the height of the liquid tank and the height of the fixing apparatus. As an example, the height of the injected liquid metal may be more than the height of the cooling plate of the battery pack fixed on the fixing apparatus, and less than the height of the liquid tank.

In step 203, the insulation detector is turned on.

The insulation detector is turned on, so that the insulation detector applies voltage to determine whether the insulation coating is electrically connected to the inner wall of the cooling plate of the battery pack.

It should be understood that the inner wall of the cooling plate of the battery pack is electrically connected to one end of the insulation detector, and the outer surface of the cooling plate of the battery pack is electrically connected to the another end of the insulation detector through liquid metal, thus it may be determined by using the insulation detector whether the inner wall of the cooling plate of the battery pack is insulated from the outer surface of the cooling plate of the battery pack, thereby determining the insulation of the insulation coating of the cooling plate of the battery pack.

In step 204, it is determined whether the insulation coating of the cooling plate of the battery pack reaches a preset insulation condition based on a resistance measured by the insulation detector.

The preset insulation condition may be configured according to actual application scenarios. In some embodiments, the preset insulation condition may include: insulation voltage ≥4 KV, and leakage current ≤0.5 MA.

It should be noted that the insulation detection method according to the embodiments may be applied to the insulation detection device according to the embodiments of the present disclosure. In the insulation detection method, the cooling plate of the battery pack to be detected is fixed in the liquid tank by using the fixing apparatus, and then the liquid metal is injected as the conductive material. The liquid metal may fully contact the insulation coating on the outer surface of the cooling plate of the battery pack, improving the accuracy of detection. In addition, the liquid metal has a viscosity, effectively avoiding liquid leakage, and thereby ensuring safety under the high voltage applied in the insulation detection process. Therefore, with the insulation detection method according to the embodiments of the present disclosure, insulation detection can be performed on the cooling plate of the battery pack safely and accurately.

In some embodiments, that the cooling plate of the battery pack is connected to the fixing apparatus includes: placing both ends of the cooling plate of the battery pack on the protrusions the first insulation elements; placing the second insulation elements on upper surfaces of the ends of the cooling plate of the battery pack; and applying pressure to the second insulation elements by using the cylinder to fixedly connect the cooling plate of the battery pack to the liquid tank.

Referring to FIG. 1, the protrusions of the first insulation element are arranged at both ends of the first insulation element, and the two ends of the cooling plate of the battery pack are placed at both ends of the first insulation elements. The second insulation elements may be placed on the upper surface of the two ends of the cooling plate of the battery pack (it should be understood that the lower surfaces of the two ends of the cooling plate of the battery pack have been in contact with the first insulation elements). Then, pressure is applied by the cylinder to the second insulation elements, so that the gap between the first insulation elements and the lower surface of the cooling plate of the battery pack is reduced, and the gap between the upper surface of the cooling plate of the battery pack and the second insulation elements may be reduced, thereby preventing the liquid metal from flowing out from the connection between the cooling plate of the battery pack and the fixing apparatus, and improving the safety of insulation detection.

It should be noted that, for the insulation detection device involved in the insulation detection method according to the present disclosure, reference may be made to the description of the insulation detection device in the embodiments of the present disclosure, which is repeated herein.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the solutions according to the present disclosure have been described in language specific to structural features and/or logical actions of the method, it should be understood that the solutions defined in the appended claims are unnecessarily limited to the specific features or actions described above. The specific features and actions described above are merely exemplary forms of implementing the claims.

The invention claimed is:

1. An insulation detection device for a cooling plate of a battery pack, comprising:
   a liquid tank configured to hold a liquid metal, wherein the liquid tank comprises a liquid injection port and a liquid outlet, the liquid metal is injected via the liquid injection port, and the liquid metal is exported via the liquid outlet;
   a fixing apparatus configured to fix the cooling plate of the battery pack in the liquid tank, wherein the cooling plate of the battery pack is hollow, an outer surface of the cooling plate of the battery pack is coated with an insulation coating, and the outer surface of the cooling plate of the battery pack is immersed in liquid metal; and
   an insulation detector configured to measure a resistance between an inner wall of the cooling plate of the battery pack and the liquid metal.

2. The insulation detection device according to claim 1, wherein the liquid metal has a melting point less than or equal to a first temperature threshold, the liquid metal has a viscosity greater than or equal to a first viscosity threshold and less than or equal to a second viscosity threshold, and the first viscosity threshold is greater than 0 and less than the second viscosity threshold.

3. The insulation detection device according to claim 1, wherein
   the fixing apparatus further comprises first insulation elements and second insulation elements;
   the first insulation elements are fixed on a bottom surface of the liquid tank, and for each of the first insulation elements, two ends of the first insulation element are arranged with protrusions;
   the cooling plate of the battery pack is connected to the protrusions of each of the first insulation elements; and
   the second insulation elements are configured to cooperate with the protrusions of the first insulation elements to clamp the cooling plate of the battery pack.

4. The insulation detection device according to claim 3, further comprising:
   a cylinder, configured to apply pressure to the second insulation elements to fixedly connect the cooling plate of the battery pack to the liquid tank.

5. The insulation detection device according to claim 3, wherein
   a cross section of each of the protrusions of the first insulation elements is a circular ring, and a cross section of each of the second insulation elements is a circular ring;
   a connection hole is defined at each of ends of the cooling plate of the battery pack; and
   a hollow inner cavity is formed by an annular region of each of the first insulation elements and an annular region of each of the second insulation elements, connection pieces are arranged in the hollow inner cavity, and the connection pieces pass through connection holes of the cooling plate of the battery pack.

6. The insulation detection device according to claim 5, further comprising:
   conductive pressing blocks, wherein
   each of the conductive pressing blocks is not in contact with the liquid metal, is connected to the insulation detector, and is arranged above the connection pieces; and
   the connection pieces are electrically connected to the inner wall of the cooling plate of the battery pack.

7. The insulation detection device according to claim 1, further comprising:
   a housing, wherein
   the housing comprises a shell and an inner tank, the shell is made of insulation material, the inner tank is made of stainless steel, and the liquid tank is arranged in the housing.

8. The insulation detection device according to claim 1, further comprising:
   an overflow pipe, wherein
   a first end of the overflow pipe is arranged between the liquid tank and the housing, and
   a second end of the overflow pipe is connected to a pipe connected with the liquid outlet.

9. An insulation detection method, applied to the insulation detection device according to claim 1, and comprising:
   connecting the cooling plate of the battery pack to the fixing apparatus;
   injecting the liquid metal into the liquid tank;
   turning on the insulation detector, and
   determining whether the insulation coating of the cooling plate of the battery pack reaches a preset insulation condition based on a resistance measured by the insulation detector.

10. The insulation detection method according to claim 9, wherein the connecting the cooling plate of the battery pack to the fixing apparatus comprises:
   placing both ends of the cooling plate of the battery pack on the protrusions the first insulation elements;
   placing the second insulation elements on upper surfaces of the ends of the cooling plate of the battery pack; and
   applying pressure to the second insulation elements by using the cylinder to fixedly connect the cooling plate of the battery pack to the liquid tank.

\* \* \* \* \*